(12) United States Patent
Wernersson

(10) Patent No.: US 7,415,199 B2
(45) Date of Patent: Aug. 19, 2008

(54) IMAGE CAPTURE APPARATUS, METHODS AND COMPUTER PROGRAM PRODUCTS USING AUTO-FOCUS-GENERATED DISTANCE ESTIMATES TO CONTROL FLASH AND IMAGE STABILIZATION

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 522 days.

(21) Appl. No.: 11/136,055

(22) Filed: May 24, 2005

(65) Prior Publication Data

US 2006/0269261 A1    Nov. 30, 2006

(51) Int. Cl.
G03B 15/03    (2006.01)
G03B 17/00    (2006.01)

(52) U.S. Cl. .......................................... 396/55; 396/61
(58) Field of Classification Search .................... 396/55, 396/61
See application file for complete search history.

(56) References Cited

U.S. PATENT DOCUMENTS

| | | | |
|---|---|---|---|
| 5,084,724 A | 1/1992 | Maeno | |
| 5,708,864 A | 1/1998 | Katayama et al. | |
| 5,940,630 A | 8/1999 | Washisu | |
| 6,151,073 A | 11/2000 | Steinberg et al. | |
| 6,285,831 B1 | 9/2001 | Hara | |
| 6,441,856 B1 | 8/2002 | Sugimoto | |

OTHER PUBLICATIONS

International Search Report, PCT/EP2006/062149, Jun. 7, 2006.

*Primary Examiner*—W. B. Perkey
(74) *Attorney, Agent, or Firm*—Myers Bigel Sibley & Sajovec PA

(57) ABSTRACT

A distance to a subject in a scene is determined using an automatic focus (AF) system of a digital camera. Image stabilization and flash are selectively automatically enabled based on the determined distance to capture an image of the scene. For example, in some embodiments, an exposure time for the scene may be determined using an automatic exposure (AE) system of the digital camera, and selective use of image stabilization and flash may involve, responsive to the determined exposure time exceeding the maximum exposure time, capturing an image of the scene using the determined exposure time with image stabilization if the determined distance exceeds a maximum flash range or capturing an image of the scene using a predetermined exposure time with flash if the determined distance is within the maximum flash range.

20 Claims, 3 Drawing Sheets

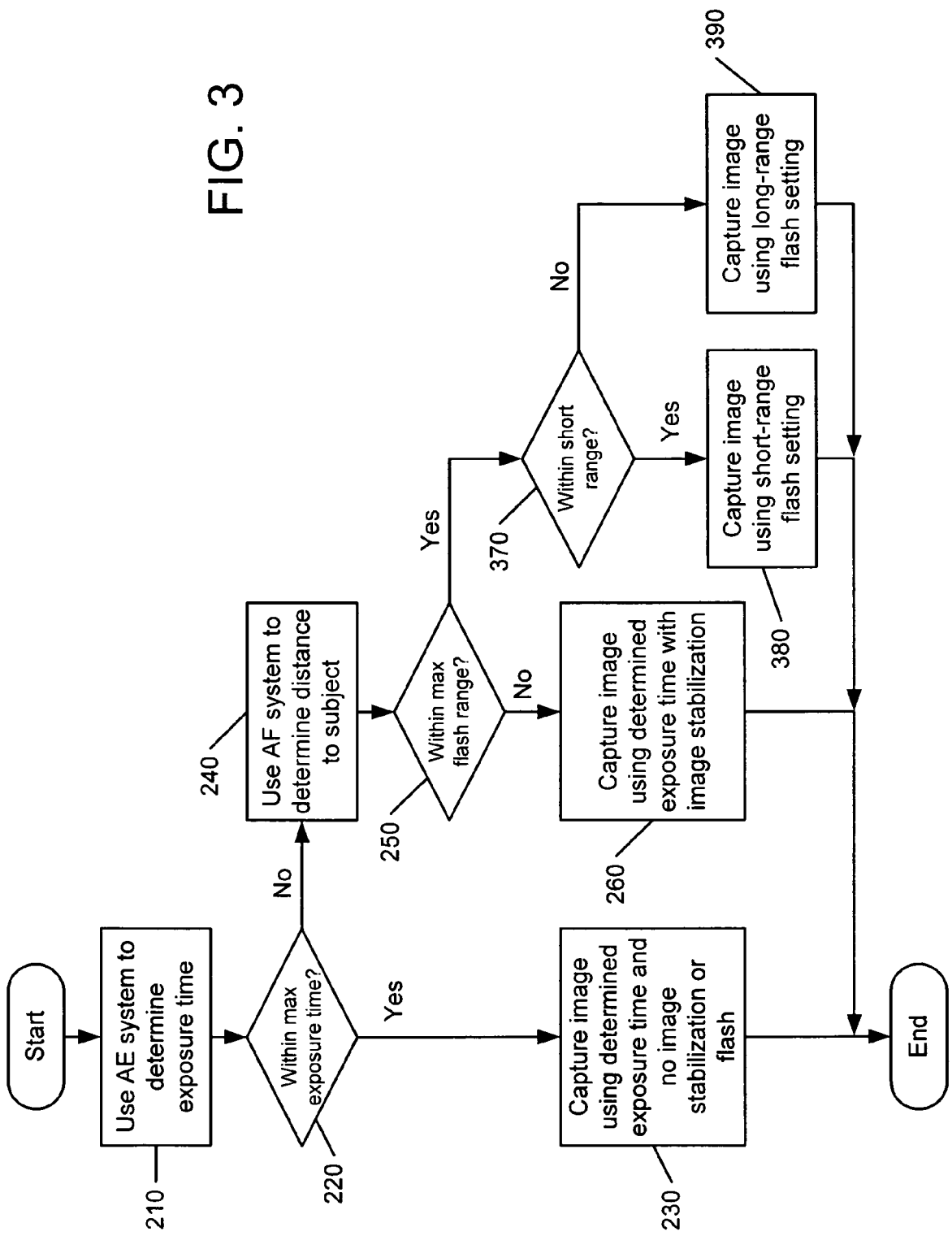

IMAGE CAPTURE APPARATUS, METHODS AND COMPUTER PROGRAM PRODUCTS USING AUTO-FOCUS-GENERATED DISTANCE ESTIMATES TO CONTROL FLASH AND IMAGE STABILIZATION

FIELD OF THE INVENTION

The present invention relates to digital image capture apparatus, methods and computer program products and, more particularly, to control of flash and image stabilization in such apparatus, methods and program products.

DESCRIPTION OF RELATED ART

A typical digital camera, such as a camera provided in a mobile terminal, may include an automatic exposure (AE) system that senses lighting conditions for a scene and determines exposure parameters, such as exposure time, image sensor gain and/or aperture, appropriate for capturing an image of suitable quality. A digital camera also typically includes an automatic focus (AF) system that determines distance to a subject in the scene, which can be used to adjust optical elements of the camera to achieve focus. A flash (e.g., a white LED or Xenon tube) may also be included so that images may be captured under low lighting conditions. A digital camera may also include an image stabilizer that can be used to compensate for motion of the camera, such that relatively sharp exposures can be made at relatively long exposure times. Under low light conditions, a user may use the flash and/or the image stabilizer to achieve better images.

Some digital cameras may include systems that adjust flash operation based on scene characteristics, such as the amount of reflected light coming from a scene and/or distance to a subject in the scene. For example, U.S. Pat. No. 6,151,073 to Steinberg et al. and U.S. Pat. No. 6,441,856 to Sugimoto describe flash systems for digital cameras that receive light data from one or more pre-flashes and responsively determine a desirable flash energy for image capture. Some digital cameras may use a technique, sometimes referred to as "guide number control," in which distance to a subject in a scene is determined using a sensor (e.g., a sensor used in an automatic focus (AF) system) and the distance information is used to control flash duration. While such techniques may provide desirable results, they may be too complex and/or costly to use in lower cost digital cameras, such as those that may be included in a multifunction device, such as a mobile terminal, personal digital assistant (PDA) or music player.

SUMMARY OF THE INVENTION

In some embodiments of the present invention, methods for operating a digital camera are provided. A distance to a subject in a scene is determined using an automatic focus (AF) system of the digital camera. Image stabilization and flash are selectively automatically enabled based on the determined distance to capture an image of the scene. For example, in some embodiments, an exposure time for the scene may be determined using an automatic exposure (AE) system of the digital camera, and selective use of image stabilization and flash may involve, responsive to the determined exposure time exceeding the maximum exposure time, capturing an image of the scene using the determined exposure time with image stabilization if the determined distance exceeds a maximum flash range or capturing an image of the scene using a predetermined exposure time with flash if the determined distance is within the maximum flash range. Capturing an image of the scene using a predetermined exposure time with flash if the determined distance is within the maximum flash range may comprise capturing an image of the scene using a first predetermined exposure setting with flash if the determined distance is within a first range less than the maximum flash range or capturing an image of the scene using a second predetermined exposure setting with flash if the determined distance exceeds the first range and is within the maximum flash range. The first predetermined exposure setting may comprise a first gain, and the second predetermined exposure setting may comprise a second gain that is greater than the first gain.

In further embodiments of the present invention, a digital camera includes an image capture system operatively associated with a flash and comprising an automatic focus (AF) system configured to determine a distance to a subject in a scene. The image capture system is configured to capture an image of the scene selectively automatically enabling image stabilization and the flash based on the determined distance. The image capture system may further comprise an automatic exposure (AE) system configured to determine an exposure time for the scene, and the image capture system may be configured to capture an image of the scene using the determined exposure time with image stabilization if the determined exposure time exceeds a maximum exposure time limit and the determined distance exceeds a maximum flash range and to capture an image of the scene using a predetermined exposure time and flash if the determined exposure time exceeds the maximum exposure time limit and the determined distance is within the maximum flash range. The image capture system may be further configured to capture an image of the scene using the determined exposure time without image stabilization and without flash if the determined exposure time is within the maximum exposure time limit.

Additional embodiments of the present invention provide computer program products for controlling a digital camera. The computer program product comprises computer program code embodied in a computer-readable storage medium, the computer program code comprising program code configured to determine a distance to a subject in a scene using an automatic focus (AF) system of the digital camera and program code configured to cause an image capture system of the digital camera to selectively use image stabilization and flash based on the determined distance in capturing an image of the scene. The computer program code may further comprise program code configured to determine an exposure time for the scene using an automatic exposure (AE) system of the digital camera. The program code configured to cause an image capture system of the digital camera to selectively use image stabilization and flash based on the determined distance in capturing an image of the scene may comprise program code configured to cause the image capture system to capture an image of the scene using the determined exposure time with image stabilization if the determined exposure time exceeds the maximum exposure time limit and the determined distance exceeds a maximum flash range and to capture an image of the scene using a predetermined exposure time with flash if the determined exposure time exceeds the maximum exposure time limit and the determined distance is within the maximum flash range. The computer program code may further comprise program code configured to cause the image capture system to capture an image of the scene using the determined exposure time without image stabilization and without flash if the determined exposure time is within the maximum exposure time limit.

BRIEF DESCRIPTION OF THE DRAWINGS

FIGS. 2 and 3 are flowcharts illustrating image capture apparatus and operations according to further embodiments of the present invention.

DETAILED DESCRIPTION OF EXEMPLARY EMBODIMENTS

Figure 1:
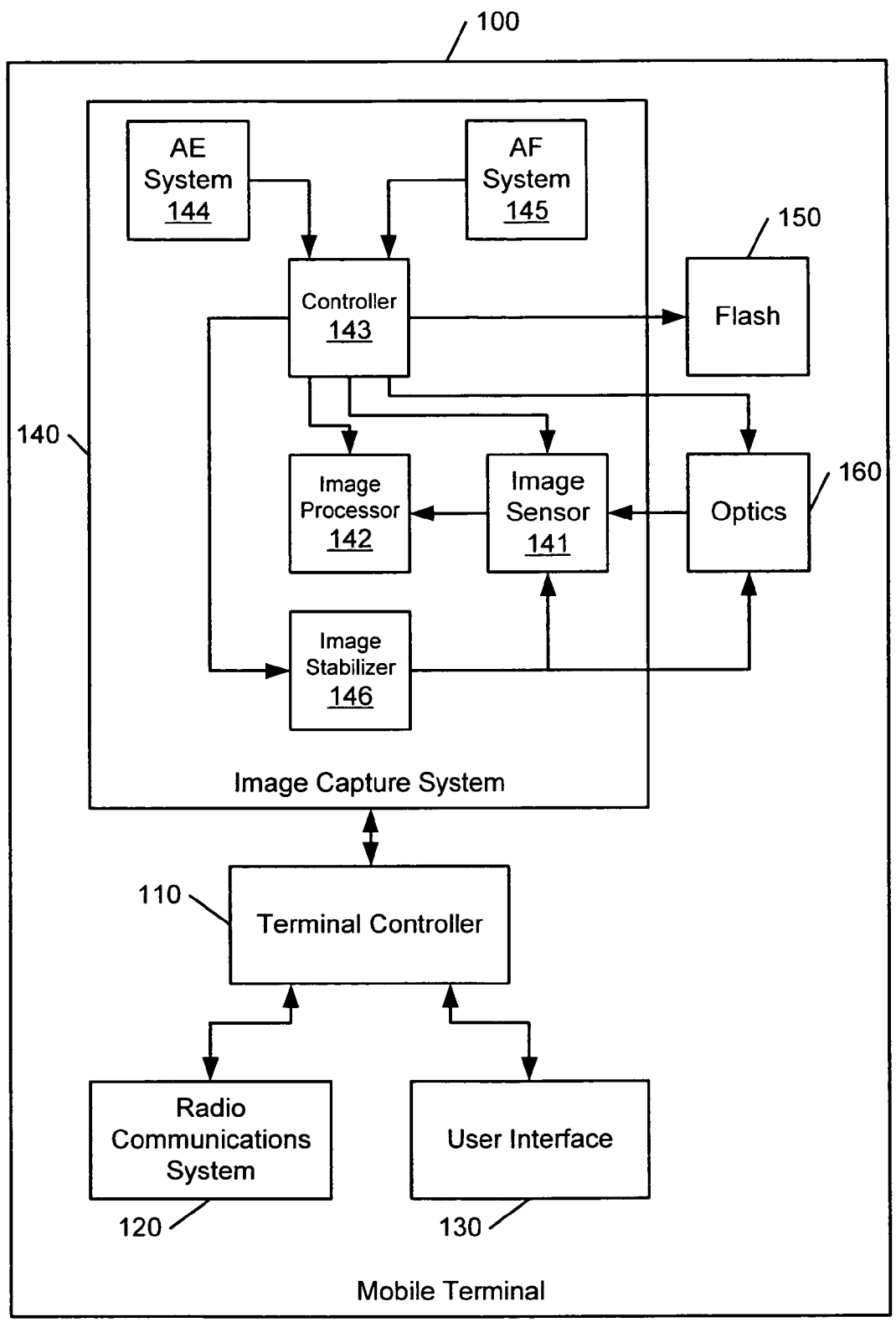
FIG. 1 is a schematic diagram illustrating a mobile terminal incorporating a digital camera according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, a "digital camera" includes standalone cameras as well as digital cameras incorporated in other devices including, but not limited to mobile terminals, music players, video players, Personal Communications System (PCS) terminals, Personal Digital Assistants (PDA), laptop computers, notebook computers, and handheld computers.

FIG. 1 illustrates a digital camera, more particularly, a mobile terminal 100 with an integrated digital camera, according to some embodiments of the present invention. The mobile terminal 100 includes a terminal controller 110, which may, for example, be implemented in a microprocessor or other processor device. The terminal controller 110 is operatively associated with a radio communications system 120, a user interface 130, and an image capture system 140. The radio communications system 120 may include various radio signal processing circuits, such as power amplifiers, oscillators, mixers, baseband processors, and the like, operations of which are known to those skilled in the art and will not be described in further detail. The user interface system 130 may include, for example, a keypad, microphone, and display, the operations of which are also known to those skilled in the art and will not be described in further detail. It will be appreciated that portions of the radio communications system 120 and the user interface system 130 may be implemented using circuitry in common, e.g., a common microprocessor, with the terminal controller 130.

In the illustrated embodiments, the image capture system 140 includes an image sensor 141, an image processor 142, a controller 143, an automatic exposure (AE) system 144, an automatic focus (AF) system 145 and an image stabilizer 146. The image sensor 141 may include, for example, an image sensor array and associated components, such as a shutter and/or capture buffer, and is configured to receive light via a set of optics 160 and to generate sensor signals responsive thereto. The image processor 142 may be configured to generate image data, e.g., TIFF, JPEG or other image format files, from the sensor signals generated by the image sensor 141.

The AE system 144 is configured to determine exposure parameters, such as aperture, exposure time, and/or gain to be used in capturing images using the image sensor 141, and to convey such information to the controller 143, which may responsively control operations of the image sensor 141 and the image processor 142. The AF system 145 is configured to determine distance to a subject in a scene, and to convey such information to the controller 143, which may responsively control the optics 160 to achieve a desired focus. The image stabilizer 146 is operative to provide compensation for movement, such as hand-induced camera shake, in scenes captured using the image sensor 141. For example, the image stabilizer 146 may be an optical image stabilizer that is configured to move portions of the optics 160 and/or the image sensor 141 to compensate for camera motion. As shown, the controller 143 is operative to control the image stabilizer 146, for example, to enable or disable operation thereof. The controller 143 is further operative to enable and disable a flash 150 that may be used in conjunction with the image capture system 140. It will be appreciated that the implementation of the image capture system 140 is provided for purposes of illustration, and that an image capture system may be implemented using a variety of different configurations within the scope of the present invention. It will be further understood that components of the image capture system 140 generally may be implemented using a variety of analog circuits, digital circuits and combinations thereof, some of which may be used in common with other components of the mobile terminal 100.

Figure 2:
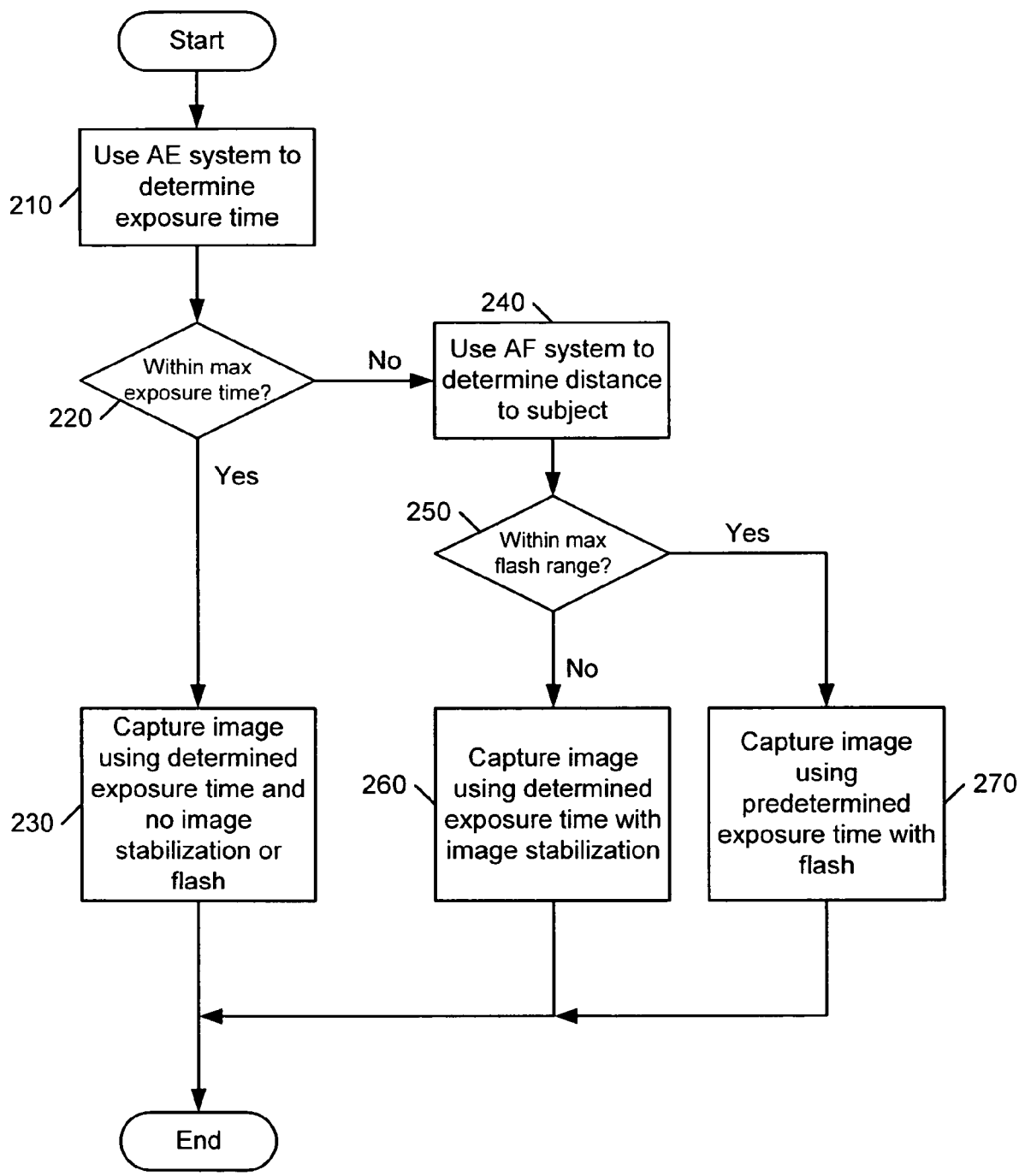

Exemplary operations of the image capture system 140 according to some embodiments of the present invention are described below with reference to FIGS. 1-3. In particular, the operations illustrated in FIGS. 2 and 3 may be executed by the controller 143 and other components of the image capture system 140. Referring to FIGS. 1 and 2, according to some embodiments of the present invention, flash and image stabilization may be selectively enabled (applied) responsive to a distance determination by the AF system 145. The AE system 144 may be used to determine appropriate exposure parameters, including, but not limited to, exposure time (block 210). If the determined exposure time is within a maximum exposure time, e.g., an exposure time below which camera shake has negligible impact, an image is captured by the image sensor 141 and the image processor 142 using the determined exposure time, without use of the flash 150 or the image stabilizer 146 (blocks 220, 230). If, however, the determined exposure time exceeds the maximum exposure time, the AF system 145 may be used to determine a distance to a subject in the scene (block 240) for use in selective use of the flash 150 and the image stabilizer 146. The determined distance may be an actual distance (e.g., feet or meters), or may be a quantity, such as a focal step number, that is representative of distance. If the determined distance is within a maximum flash range, e.g., a maximum effective range for the flash 150, an image is captured using the flash 150 without image stabilization and using a predetermined exposure setting, including a predetermined exposure time (blocks 250, 270). If the determined range exceeds the maximum flash range, however, an image is captured using the image stabilizer 146 without flash (blocks 250, 260).

FIG. 3 illustrates exemplary operations according to further embodiments of the present invention in which different flash exposure settings may be used dependent on distance information provided by the AF system 144. In FIG. 3, operations of Blocks 210-260 are as described above with reference to FIG. 2, and further description of the operations of these blocks will not be provided in lieu of the preceding description of FIG. 2. At Block 370 of FIG. 3, once it has been determined that the distance determined by the AF system 145 is within the maximum flash range (block 250), a second determination is made as to whether the distance falls within or outside of a predefined "short" range (e.g., 1 meter) (block 370). If the distance is within the short range, an image is capture using a short-range flash exposure setting (block 380). If not, a long-range flash exposure setting is used (block 390). The short-range flash exposure setting may utilize a relatively low gain in comparison to a gain used in the long-range flash exposure setting, such that noise in the digital image can be reduced when imaging close-up subjects. Such a low-gain setting may not be desirable at greater distances.

The flowcharts, flow diagrams and block diagrams of FIGS. 1-3 illustrate architecture, functionality, and operations of possible implementations of apparatus, methods and computer program products according to various embodiments of the present invention. It should be noted that, in some embodiments of the present invention, components may be arranged differently than shown in the figures and/or acts may occur in an order different than that shown in the figures. For example, two blocks shown in succession may, in fact, be executed substantially concurrently, or the blocks may sometimes be executed in the reverse order, depending upon the functionality involved.

Various embodiments of the present invention have been described above with reference to block diagrams and/or operational illustrations (e.g., flowcharts) illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products. For example, in the embodiments described herein with reference to FIGS. 1-3, such computer program instructions may be provided to a processor configured to control an image capture system, thus supporting, among other things, digital cameras, methods of operating digital cameras, and computer program products for controlling digital cameras.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of operating a digital camera, the method comprising:
   determining a distance to a subject in a scene using an automatic focus (AF) system of the digital camera;
   determining an exposure time for the scene using an automatic exposure (AE) system of the digital camera; and
   selectively automatically enabling image stabilization and flash based on the determined distance to capture an image of the scene, wherein selectively automatically enabling image stabilization and flash based on the determined distance to capture an image of the scene comprises selectively performing one of the following, responsive to the determined exposure time exceeding a maximum exposure time limit:
   if the determined distance exceeds a maximum flash range, capturing an image of the scene using the determined exposure time with image stabilization; or
   if the determined distance is within the maximum flash range, capturing an image of the scene using a predetermined exposure time with flash.

2. A method according to claim 1, wherein capturing an image of the scene using the determined exposure time with image stabilization comprises capturing an image of the scene using the determined exposure time with image stabilization and without flash.

3. A method according to claim 1, wherein capturing an image of the scene using a predetermined exposure time with flash comprises capturing an image of the scene using the predetermined exposure time with flash and without image stabilization.

4. A method according to claim 1:
   wherein determining an exposure time for the scene using an automatic exposure (AE) system of the digital camera comprises determining an exposure time and gain for the scene using the AE system;
   wherein capturing an image of the scene using the determined exposure time with image stabilization comprises capturing an image of the scene using the determined exposure time and gain; and
   wherein capturing an image of the scene using a predetermined exposure time with flash comprises capturing an image of the scene using the predetermined exposure time and a predetermined gain.

5. A method according to claim 1, wherein capturing an image of the scene using a predetermined exposure time with flash comprises performing one of the following:
   if the determined distance is within a first range less than the maximum flash range, capturing an image of the scene using a first predetermined exposure setting with flash; or
   if the determined distance is greater than the first range and within the maximum flash range, capturing an image of the scene using a second predetermined exposure setting with flash.

6. A method according to claim 5, wherein the first predetermined exposure setting comprises a first gain, and wherein the second predetermined exposure setting comprises a second gain that is greater than the first gain.

7. A digital camera comprising:

a flash; and an image capture system operatively associated with the flash and comprising an automatic focus (AF) system configured to determine a distance to a subject in a scene, wherein the image capture system is configured to capture an image of the scene by selectively automatically enabling image stabilization and the flash based on the determined distance, wherein the image capture system further comprises an automatic exposure (AE) system configured to determine an exposure time for the scene, and wherein the image capture system is configured to capture an image of the scene using the determined exposure time with image stabilization if the determined exposure time exceeds a maximum exposure time limit and the determined distance exceeds a maximum flash range and to capture an image of the scene using a predetermined exposure time and flash if the determined exposure time exceeds the maximum exposure time limit and the determined distance is within the maximum flash range.

8. A digital camera according to claim 7, wherein the image capture system is further configured to capture an image of the scene using the determined exposure time without image stabilization and without flash if the determined exposure time is within the maximum exposure time limit.

9. A digital camera according to claim 7, wherein the image capture system is configured to capture an image of the scene using the determined exposure time with image stabilization and without flash if the determined exposure time exceeds the maximum exposure time limit and the determined distance exceeds the maximum flash range.

10. A digital camera according to claim 7, wherein the image capture system is configured to capture an image of the scene using the predetermined exposure time with flash and without image stabilization if the determined exposure time exceeds the maximum exposure time limit and the determined distance is within the maximum flash range.

11. A digital camera according to claim 7:
wherein the AE system is configured to determine an exposure time and gain for the scene; and
wherein the image capture system is configured to capture an image of the scene using the determined exposure time and gain if the determined exposure time exceeds the maximum exposure time limit and the determined distance exceeds the maximum flash range and to capture an image of the scene using the predetermined exposure time and a predetermined gain if the determined exposure time exceeds the maximum exposure time limit and the determined distance is within the maximum flash range.

12. A digital camera according to claim 7, wherein the image capture system is configured to capture an image of the scene using a first predetermined exposure setting with flash if the determined exposure time exceeds the maximum exposure time limit and the determined distance is within a first range less than the maximum flash range and to capture an image of the scene using a second predetermined exposure setting with flash if the determined exposure time exceeds the maximum exposure time limit and the determined distance is greater than the first range and within the maximum exposure range.

13. A digital camera according to claim 12, wherein the first predetermined exposure setting comprises a first gain, and wherein the second predetermined exposure setting comprises a second gain that is greater than the first gain.

14. A mobile terminal including a digital camera according to claim 7.

15. A computer program product for controlling a digital camera, the computer program product comprising computer program code embodied in a computer-readable storage medium, the computer program code comprising:
program code configured to determine a distance to a subject in a scene using an automatic focus (AF) system of the digital camera;
program code configured to cause an image capture system of the digital camera to selectively automatically enable image stabilization and flash based on the determined distance in capturing an image of the scene; and
program code configured to determine an exposure time for the scene using an automatic exposure (AE) system of the digital camera, wherein the program code configured to cause an image capture system of the digital camera to selectively automatically enable image stabilization and flash based on the determined distance in capturing an image of the scene comprises program code configured to cause the image capture system to capture an image of the scene using the determined exposure time with image stabilization if the determined exposure time exceeds the maximum exposure time limit and the determined distance exceeds a maximum flash range and to capture an image of the scene using a predetermined exposure time with flash if the determined exposure time exceeds the maximum exposure time limit and the determined distance is within the maximum flash range.

16. A computer program product according to claim 15, wherein the computer program code further comprises program code configured to cause the image capture system to capture an image of the scene using the determined exposure time without image stabilization and without flash if the determined exposure time is within the maximum exposure time limit.

17. A computer program product according to claim 15, wherein the program code configured to cause an image capture system of the digital camera to selectively automatically enable image stabilization and flash based on the determined distance in capturing an image of the scene comprises program code configured to cause the image capture system to capture an image of the scene using the determined exposure time with image stabilization and without flash if the determined exposure time exceeds the maximum exposure time limit and the determined distance exceeds the maximum flash range and to capture an image of the scene using the predetermined exposure time with flash and without image stabilization if the determined exposure time exceeds the maximum exposure time limit and the determined distance is within the maximum flash range.

18. A computer program product according to claim 15:
wherein the program code configured to determine an exposure time for the scene using an automatic exposure (AE) system of the digital camera comprises computer program code configured to determine an exposure time and gain for the scene using the AE system; and
wherein the program code configured to cause an image capture system of the digital camera to selectively automatically enable image stabilization and flash based on the determined distance in capturing an image of the scene comprises program code configured to capture an image of the scene using the determined exposure time and gain if the determined exposure time exceeds the maximum exposure time limit and the determined distance exceeds the maximum flash range and to capture an image of the scene using the predetermined exposure time and a predetermined gain if the determined exposure time exceeds the maximum exposure time limit and the determined distance is within the maximum flash range.

19. A computer program product according to claim 15, wherein the program code configured to cause an image capture system of the digital camera to selectively automatically enable image stabilization and flash based on the determined distance in capturing an image of the scene comprises program code configured to capture an image of the scene using a first predetermined exposure setting with flash if the determined exposure time exceeds the maximum exposure time limit and the determined distance is within a first range less than the maximum flash range and to capture an image of the scene using a second predetermined exposure setting with flash if the determined exposure time exceeds the maximum exposure time limit and the determined distance exceeds the first range and is within the maximum flash range.

20. A computer program product according to claim 19, wherein the first predetermined exposure setting comprises a first gain, and wherein the second predetermined exposure setting comprises a second gain that is greater than the first gain.

* * * * *